United States Patent [19]
Krylov

[11] 3,735,521
[45] May 29, 1973

[54] DEVICE FOR DISENGAGING AND RECOVERING FISHING GEAR

[76] Inventor: Constantin A. Krylov, Bld. 701, Apt. H, Garmisch-Breitenau, Germany

[22] Filed: Feb. 17, 1972

[21] Appl. No.: 227,526

[30] Foreign Application Priority Data
Nov. 20, 1971 Germany..................P 21 57 717.3

[52] U.S. Cl. .............................................. 43/17.2
[51] Int. Cl. ............................................. A01k 97/00
[58] Field of Search...................43/17.2, 5, 44.97

[56] References Cited
UNITED STATES PATENTS

| | | | |
|---|---|---|---|
| 2,184,589 | 12/1939 | Griffith | 43/17.2 |
| 2,516,036 | 7/1950 | Whitlow et al. | 43/17.2 |
| 2,926,449 | 3/1960 | Rupert | 43/17.2 |
| 3,360,292 | 12/1967 | Trammell | 43/17.2 X |
| 3,574,967 | 4/1971 | Splawinski | 43/17.2 |

Primary Examiner—Antonio F. Guida
Assistant Examiner—James H. Czerwonky
Attorney—John Lezdey, Robert Osann, Jack F. Kramer et al.

[57] ABSTRACT

A device for disentangling and recovering fishing gear entangled or hooked below the water surface comprising a frame, a recovery line, and a first ring member on said frame for fastening said recovery line. First and second jaw means of U-shaped form are at substantially right angles to said first ring member, said first jaw means being fastened to said frame, said second jaw means being hingeably connected to said frame so as to open opposite said first jaw means when actuated. A tiltable member is connected with said first jaw means and rotatable in the plane of said first jaw means for inserting the fishing line. After releasing the recovery line, the device slides forward and rotates and simultaneously part of the fishing gear moves between the two jaw means.

6 Claims, 5 Drawing Figures

PATENTED MAY 29 1973
3,735,521
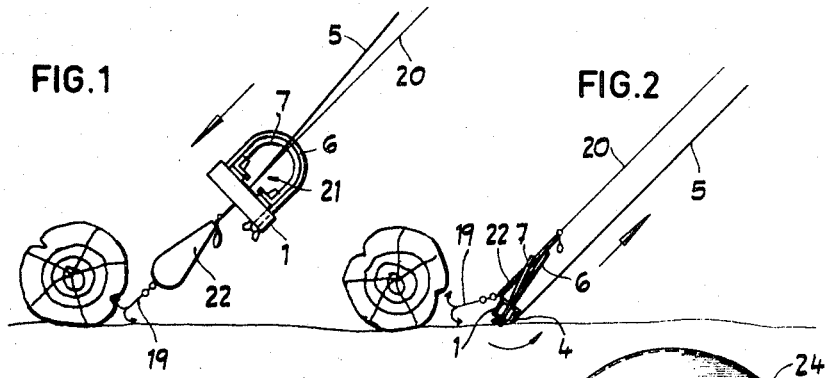
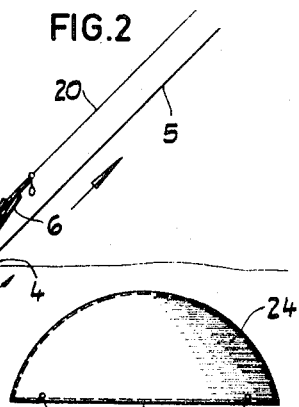
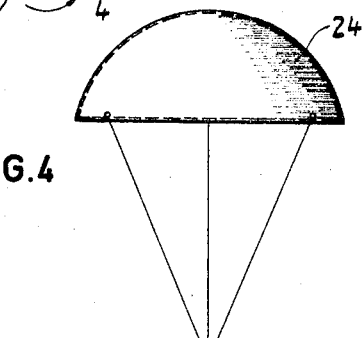
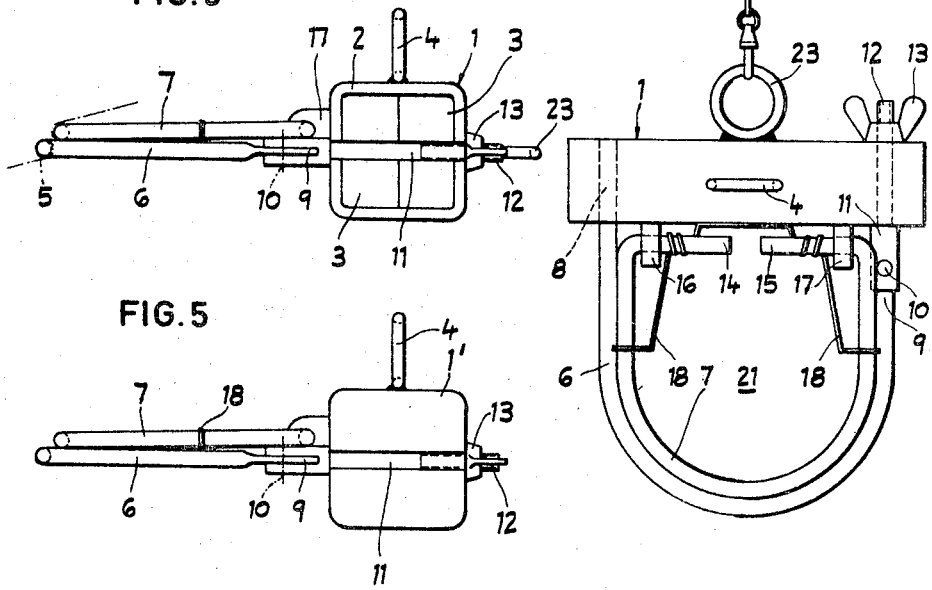
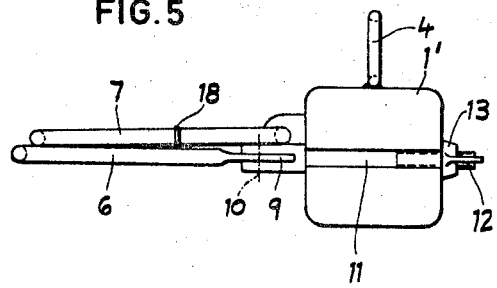

DEVICE FOR DISENGAGING AND RECOVERING FISHING GEAR

The invention relates to a device for disengaging artificial bait, metallic spoon-bait, spoons, fishing hooks, and the like, that get caught or hooked during fishing.

While the fishing hooks proper usually are only penny items, loss of which carries little consideration, the artificial baits, spoon-baits, and the like, immediately fastened to the fishing line behind the fishing hook do in part represent costly accessories, the loss of which should be avoided if possible. Similar considerations apply to the fishing line, of which much is often lost when there occurs violent pulling.

It is an object of this invention to provide a simple device by means of which the fishing gear entangled below the water surface may be disentangled and recovered insofar as possible.

Accordingly the invention consists of a device for disentangling and recovering fishing gear caught or hooked below the water surface and is characterized by a preferably parallelepipedal or cylindrical basic body or frame provided with a ring for the fastening of a recovery line and with two grab jaws approximately U-shaped and at right angles to the ring, one of which preferably is of somewhat larger periphery than the other and is provided with a tiltable member component in order to thread-in the fishing line, while the second, smaller one is so hingeably connected with the basic body that under the influence of spring elements it may be opened jaw-like opposite the larger grab jaw.

The invention is described below by means of several illustrative forms of execution relating to the drawing, wherein:

FIG. 1 shows a hooked fishing hook with spoon-bait as well as a device according to the invention on the fishing line;

FIG. 2 illustrates the device according to the invention when disentangling the hook;

FIG. 3 shows a side view of the device of the invention in approximately natural scale;

FIG. 4 shows a top view on the object of FIG. 3 with a bell for use in running waters, and FIG. 5 shows a side view corresponding to FIG. 3 for a simplified form of execution of the object of the invention.

As seen from FIGS. 3 and 4 the invention consists of parallelepipedal basic body 1 which evidently may also be made round or polygonal. According to FIGS. 3 and 4, the basic body 1 consists of a pipe-like jacket 2 and of two weights 3 inserted in the jacket. A ring 4 is fastened to the basic body 1, the ring may be holding the recovery line 5 (FIGS. 1 and 2). Preferably the recovery line consists of a strong nylon line, of about 30 to 40 kg tensional strength.

Two grab jaws 6 and 7 are mounted at right angles to ring 4, which in the drawings are of circular cross-section and of U-shape; however they may be of different cross-sections as well. One sees that one of the jaws 6 is of larger periphery than the other 7, one of the legs 8 passing through the basic body 1 and being fastened to it, for example, by soldering or welding. The second leg 9 terminates in a link 10, around which the tiltable component 11 may rotate in the plane of jaw 6. Component 11 is provided with a thread at its end and may be tightened into the closed position by means of a wing nut 13.

Ends 14 and 15 of the smaller grab jaw 17 are bent inwards at right angles and supported in the bearing brackets 16, 17 of the basic body so that they may pivot. The purpose of spring 18 is to push grab jaw 7 against grab jaw 6.

Weights are provided with slits at both ends and when component 11 is tilted, they may be moved into the pipe-like jacket 2. Then, leg 8 of one side moves into the slits of weights 3 which will be maintained in the shown normal position by the tilting of component 11 and by its fixation in this position by means of wing nuts, component 11 reaching into the other slits of the weights.

Tilting of component 11 makes possible not only the activation of weights 3, but also the simultaneously insertion of the fishing line 20 which is connected to the entangled hook 19 into the space 21 between the grab jaws 6 and the basic body 1. As shown from FIG. 1, the device according to the invention is moved in such fashion over the fishing line 20 that the basic body 1 points in the direction of the entangled fishing parts. By releasing the recovery line 5, the device according to the invention will slide forward in the direction of the arrow in FIG. 1 until the basic body reaches bottom or until part of the fishing gear has been moved in between the grab jaws 6 and 7, which prevents further slippage. This will become noticeable by a decrease in the tension in the recovery line and by a tug in the entangled fishing line, and then the fisherman begins to pull on recovery line 5 in the direction of the obliquely pointing arrow in FIG. 2.

The first result is a lifting of the leading basic body 1 and a rotation of the device according to the invention in the direction of the lower arrow in FIG. 2 by 180°, causing a simultaneous rotation of that part of the fishing gear located between the grab jaws 6 and 7, a spoon bait 22 in the drawings shown, and in most cases the attached fishing hook will be disentangled. When the fishing hook 19 is very strongly entangled, there might very well be tearing of the connection between hook and spoon bait, but the loss of the hook, as already initially mentioned, is of no particular significance.

Even if the device according to the invention does not glide, for some reason, over the spoon bait or the fisher gear immediately behind the hook, pulling the recovery line 5 nevertheless rotates the device, so that the fastening rings behind the spoon bait, the safety hook or even the fishing line knots behind the spoon bait, will be encircled by grab jaws 6 and 7, and they will embrace with large friction in the form of an S (dotted line in FIG. 3) the two grab jaws because of the rotation of the device. This results in a strong pull immediately in the vicinity of the spoon bait and of the fishing hook, which in most cases suffices to disentangle the caught gear and to recover it without tearing the fishing line in the process.

The simplified device of FIG. 5 differs from the above described one by the omission of weights 3, that is, the basic body 1' consists of a solid material, and also differs by the omission of an additional ring 23 that is provided according to FIGS. 3 and 4 on the side of the basic body 1 which is diametrically opposite to the grab jaws 6 and 7, and which serves to fasten a bell 24 acting as a kind of drag anchor.

Use of the bell is reccommended for the device according to the invention when in presence of running waters, weights 3 being removed prior to mounting the bell 24. Because of the water flow, bell 24 drags the device according to the invention along the fishing line 20 till the grab jaws seize part of the entangled fishing gear, whereupon disentanglement and recovery proceeds in the manner above described. Obviously, the embodiments shown are examplary only and a wide variety of embodiments may be devised without departing from the spirit and scope thereof.

What is claimed is:

1. A device for disentangling and recovering fishing gear entangled or hooked below the water surface comprising a frame, a recovery line, a first ring member on said frame for fastening said recovery line, a first and second jaw means of U-shaped form at substantially right angles to said first ring member, said first jaw means being fastened to said frame, said second jaw means being hingeably connected to said frame so as to open opposite said first jaw means when actuated, and a tiltable member connected with said first jaw means and rotatable in the plane of said first jaw means for inserting the fishing line whereby by releasing the recovery line the device slides forward and rotates and simultaneously part of the fishing gear moves between the two jaw means.

2. The device of claim 1 including spring means for actuating said second jaw means.

3. The device of claim 1 including a second ring mounted diametrically opposite said jaws for fastening a bell.

4. The device of claim 1 wherein said frame consists of a tubular jacket for inserting weights having slits at each end when said tiltable member is tilted.

5. The device of claim 1 wherein said first jaw means has a larger periphery than said second jaw means.

6. The device of claim 1 wherein said second jaw means has ends bent inwardly at substantially right angles and pivotably supported in brackets on said frame.

* * * * *